United States Patent [19]

Stewart

[11] 3,852,675

[45] Dec. 3, 1974

[54] TONE DETECTION AND SWITCHING CIRCUIT

[75] Inventor: Edward F. Stewart, Raleigh, N.C.

[73] Assignee: International Telephone and Telegraph Corporation, Nutley, N.J.

[22] Filed: Aug. 13, 1973

[21] Appl. No.: 387,889

Related U.S. Application Data

[62] Division of Ser. No. 296,728, Oct. 11, 1972, Pat. No. 3,790,723.

[52] U.S. Cl. .................................. 328/138, 328/140
[51] Int. Cl. .............................................. H03k 9/06
[58] Field of Search ............................ 328/138, 140

[56] References Cited

UNITED STATES PATENTS

| | | | |
|---|---|---|---|
| 3,446,996 | 5/1969 | Toffler | 328/140 X |
| 3,529,248 | 9/1970 | Boelke | 328/138 X |
| 3,555,438 | 1/1971 | Ragsdales | 328/138 X |
| 3,571,620 | 3/1971 | Hansen | 328/140 X |
| 3,696,252 | 10/1972 | Chapman | 328/138 X |
| 3,769,596 | 10/1973 | Peersch | 328/138 |

*Primary Examiner*—John S. Heyman
*Attorney, Agent, or Firm*—John T. O'Halloran; Menotti J. Lombard, Jr.; Alfred C. Hill

[57] ABSTRACT

There is disclosed a test tone detector including a tuned circuit tuned to the frequency of a test tone, a precision halfwave rectifier circuit including a first solid state operational amplifier coupled to the tuned circuit and an output circuit including a second solid state operational amplifier coupled to the output of the rectifier circuit and to the tuned circuit to produce a full wave rectified output signal with voltage gain upon detection of the test tone to actuate a switching arrangement.

2 Claims, 1 Drawing Figure

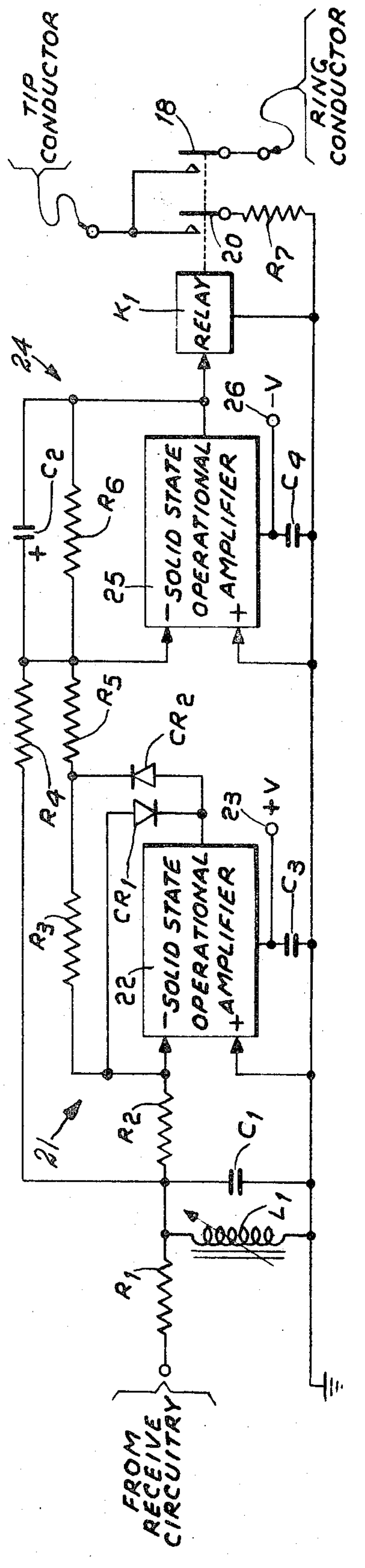
TIP CONDUCTOR
RING CONDUCTOR
FROM RECEIVE CIRCUITRY
RELAY
SOLID STATE OPERATIONAL AMPLIFIER
SOLID STATE OPERATIONAL AMPLIFIER
-V
+V

TONE DETECTION AND SWITCHING CIRCUIT

CROSS-REFERENCE TO RELATED APPLICATIONS

This is a division of application Ser. No. 296,728 filed Oct. 11, 1972, now U.S. Pat. No. 3,790,723.

BACKGROUND OF THE INVENTION

This invention relates to a loop test arrangement for a telephone system and more particularly to tone detectors employed therein.

SUMMARY OF THE INVENTION

An object of the present invention is to provide an improved toned detector to actuate a switching arrangement to establish a loop around connection in a subscriber unit of a two-wire carrier telephone channel to enable testing the transmission and signaling function of the telephone channel.

A feature of the present invention is the provision of a tone detector comprising: an input for a tone having a given frequency; a tuned circuit coupled to the input, the tuned circuit being tuned to the given frequency; a precision halfwave rectifier circuit coupled to the tuned circuit; and an output circuit coupled to the output of the rectifier circuit and to the tuned circuit to produce a full wave rectified output signal with voltage gain upon detection of the tone.

BRIEF DESCRIPTION OF THE DRAWING

Above-mentioned and other features and objects of this invention will become more apparent by reference to the following description taken in conjunction with the accompanying drawing, the FIGURE of which is a schematic diagram, partially in block form, of the improved test tone detector in accordance with the principles of the present invention.

DESCRIPTION OF THE PREFERRED EMBODIMENT

Referring to the FIGURE, there is illustrated therein, in schematic, partially block diagram, form a test tone detector in accordance with the principles of the present invention. A parallel tuned circuit including variable inductor L1 and capacitor C1 is connected at one end thereof to ground potential and at the other end thereof to receive circuitry by resistor R1. Resistor R1 provides a bridging resistance for the source of test tone. In a typical example, the test tone has a frequency of three kilohertz and, thus, the parallel tuned circuit including inductor L1 and capacitor C1 would be tuned to this frequency to allow only the test tone frequency to pass to the precision halfwave rectifier 21. Rectifier 21 includes solid state operational amplifier 22 having its non-inverting input (the +input) connected directly to ground potential and its inverting input (the −input) coupled by resistor R2 to the junction of resistor R1 and the parallel tuned circuit. Halfwave rectifier 21 further includes solid state diode CR1 poled in the direction illustrated coupled between the output of amplifier 22 and the inverting input thereof. A series circuit including resistor R3 and solid state diode CR2 is also coupled between the output of amplifier 22 and the inverting input thereof in a parallel relationship to diode CR1. The diode CR2 is poled in a direction opposite to the direction that diode CR1 is poled.

Amplifier 22 receives its operating potential +V from terminal 23 which is bypassed to ground potential through capacitor C3.

The detector circuit further includes an output circuit 24 including solid state operational amplifier 25 having its non-inverting input directly connected to ground potential. Resistor R5 couples the output of rectifier circuit 21, the junction of resistor R3 and diode CR2, to the inverting input of amplifier 25. Resistor R4 connects the input to amplifier 22, as provided by the parallel tuned circuit, to the inverting input of amplifier 25. The output of amplifier 25 is coupled in a feedback fashion by resistor R6 to the inverting input thereof. A capacitor C2 is connected in parallel with resistor R6. The output circuit 24 sums two times the magnitude of the output signal of halfwave rectifier 21 with the magnitude of the input signal to the halfwave rectifier 21 producing a full wave rectifier output signal with voltage gain at the output of amplifier 25 thereby providing a control or actuating signal for relay K1 when the test tone is detected. The contacts 18 and 20 associated with relay K1 and the resistor R7 associated with contact 20 of relay K1 operate to provide a loop around path for the tone in a subscriber unit of a two-wire carrier telephone channel to enable testing the transmission and signaling function of the telephone channel. Capacitor C2 operates to filter the full wave output signal from the output of amplifier 25 and provides delay for relay K1.

Amplifier 25 receives its −V operating potential from terminal 26 which is bypassed to ground potential by capacitor C4.

In a reduction to practice the value of the components and the type of components of the detector of the FIGURE are presented hereinbelow in the following Table.

TABLE

| | |
|---|---|
| $R_1$ = 5.11 kilohms | C1 = 0.47 microfarad |
| $R_2$ = 10 kilohms | C2 = 10 microfarad, 20 volts |
| $R_3$ = 10 kilohms | C3 = 0.01 microfarad |
| $R_4$ = 10 kilohms | C4 = 0.01 microfarad |
| $R_5$ = 5 kilohms | L1 = variable |
| $R_6$ = 330 kilohms, ¼ watt, 5% | CR1 = 1N4152 |
| $R_7$ = 2.7 kilohms, ½ watt, 5% | CR2 = 1N4152 |
| +V = +12 volts | −V = −12 volts |

While I have described above the principles of my invention in connection with specific apparatus it is to be clearly understood that this description is made only by way of example and not as a limitation to the scope of my invention as set forth in the objects thereof and in the accompanying claims. I claim:

1. A tone detector comprising:
- an input for a tone having a given frequency;
- a tuned circuit coupled to said input, said tuned circuit being tuned to said given frequency;
- a precision halfwave rectifier circuit coupled to said tuned circuit; and
- an output circuit coupled to the output of said rectifier circuit and to said tuned circuit to produce a full wave rectified output signal with voltage gain upon detection of said tone;
- said tuned circuit including
  - ground potential,
  - a first resistor having one terminal connected to said input, and a parallel coupled inductor-capacitor tuned circuit coupled between the other terminal of said first resistor and said ground potential; and said rectifier including a first solid state operational amplifier having an inverting input, a non-inverting input and an output, said non-inverting input being directly connected to said ground potential, a second resistor coupled between the junction of said first resistor and said parallel tuned circuit and said inverting input of said first amplifier, a first solid state diode being poled in a given direction connected between said output and said inverting input of said first amplifier, and a series circuit coupled between said output and said inverting input of said first amplifier in parallel with said first diode, said series circuit having a second solid state diode poled in a direction opposite to said given direction, and a third resistor.

2. A detector according to claim 1, wherein said output circuit includes a second solid state operational amplifier having an inverting input, a non-inverting input and an output, said non-inverting input being connected directly to said ground potential, a fourth resistor coupled between the junction of said second diode and said third resistor and said inverting input of said second amplifier, a fifth resistor coupled between the junction of said first resistor and said parallel tuned circuit and said inverting input of said second amplifier, a sixth resistor coupled between said output and said inverting input of said second amplifier, and a capacitor coupled in parallel to said sixth resistor, said output of said second amplifier providing said full wave rectified output signal with voltage gain upon detection of said tone.

* * * * *